Nov. 3, 1970   B. J. M. G. BRUGMAN   3,537,127
DEVICE FOR HOLDING POULTRY FOR SLAUGHTERING AND/OR PLUCKING
Filed March 26, 1968   2 Sheets-Sheet 1
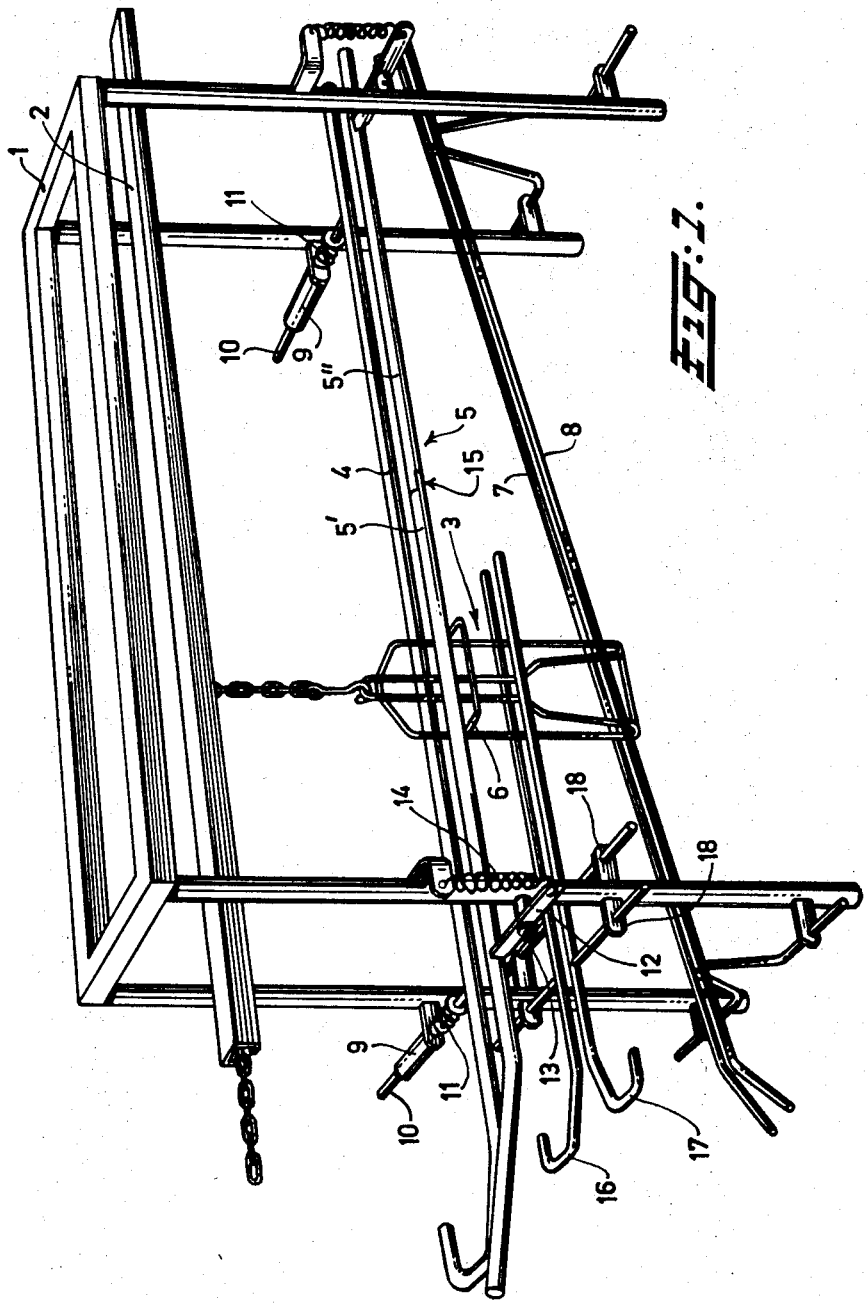
INVENTOR.
B. J. M. G. BRUGMAN
BY
Lieber & Nilles
ATTORNEYS Nov. 3, 1970   B. J. M. G. BRUGMAN   3,537,127
DEVICE FOR HOLDING POULTRY FOR SLAUGHTERING AND/OR PLUCKING
Filed March 26, 1968   2 Sheets-Sheet 2
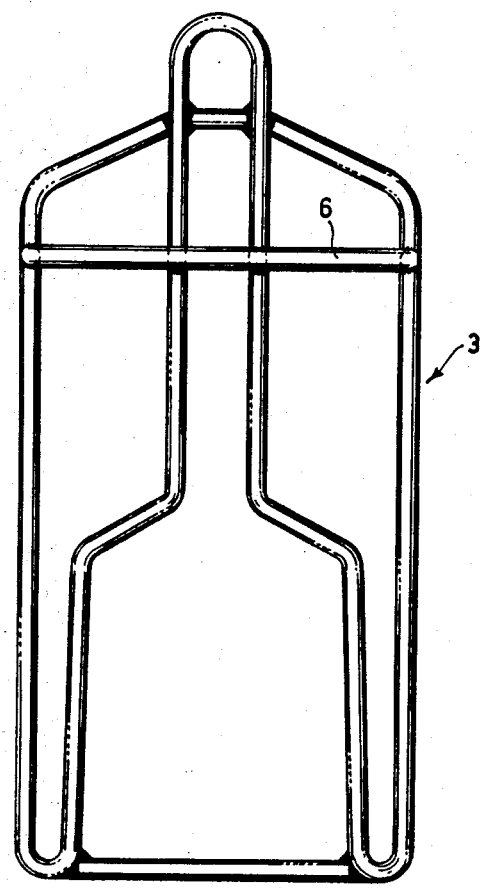
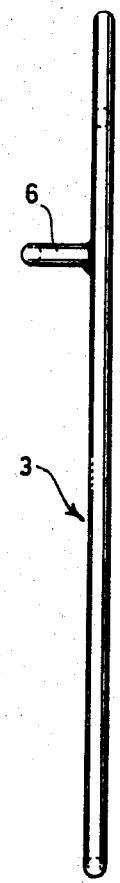
INVENTOR.
B.J.M.G. BRUGMAN
BY
Lieber & Niller
ATTORNEYS

United States Patent Office

3,537,127
Patented Nov. 3, 1970

3,537,127
DEVICE FOR HOLDING POULTRY FOR SLAUGHTERING AND/OR PLUCKING
Bram Jan Martha Gerrit Brugman, Boxmeer, Netherlands, assignor to Stork Amsterdam N.V., Amsterdam, Netherlands
Filed Mar. 26, 1968, Ser. No. 716,083
Int. Cl. A22c 21/00
U.S. Cl. 17—11      3 Claims

ABSTRACT OF THE DISCLOSURE

A device for holding poultry for slaughtering and/or plucking comprising an overhead conveyor with shackles for suspending and transporting the poultry, a station being provided in which the shackles are guided and positioned between two guide rails, said rails being displaceable against a resilient force from their operative position towards an inoperative position.

---

The invention relates to a device for slaughtering and/or plucking poultry comprising an overhead conveyor provided with a number of shackles in which the poultry to be treated can be suspended, at least two guide rails being provided in a part of the path of the conveyor, the rails in their operative position being substantially parallel to the direction of advance of the conveyor and lying on either side of the shackles, so that the shackles can be directed with respect to their direction of advance, each of these shackles having at least one projection which is capable of cooperation with a guide rail in order to limit the upward movement of the shackle.

In such a known device it is necessary to hold the shackles during their advance in a specific position for some time. This may e.g. be desirable at a discharge station, i.e. when the treatment is finished, where the poultry should be released again from the shackle. The guide rails permit to the shackles only one degree of freedom viz. a translation in the direction of advance of the conveyor. Under these circumstances the required force can be exerted on the poultry and/or on the shackle without the latter being deflected in an undesired way.

It sometimes happens that some shackles are entangled so that a rather thick pack will move between the guide rails. The invention aims at avoiding an overload occurring in the conveyor drive mechanism.

According to the invention the guide rails are movable from their operative position into a direction transverse to the direction of advance of the shackles, means being provided for elastically urging the rails back into their operative position.

When the shackle is provided with a single projection on its one side, it is advantageous that one of the two guide rails is rectilinearly movable and the other rail can be deflected arcwise. The latter rail is on that side of the shackle on which the projection is provided.

When the shackles are used with one or more projections on either side it is advisable that both guide rails can be deflected arcwise.

The foregoing and other objects and advantages of the invention will appear in the description to follow. In the description reference is made to the accompanying drawings, whch form a part hereof, and in which there is shown by way of illustration and not of limitation specific forms in which the invention may be embodied.

In the drawings:

FIG. 1 shows a perspective front view of a diagrammatically represented device.

The FIGS. 2 and 3 show a front view and side elevation of a shackle to be applied in the device according to FIG. 1.

As is visible in FIG. 1 the device consists of a frame provided with an overhead conveyor 2 to which a plurality of shackles 3 (only one is represented) are secured. A killed bird (chicken) is suspended therefrom in a commonly known way (not shown). The conveyor 2 follows a path of which FIG. 1 gives only a very small part viz. the discharge station, i.e. where the poultry should be lifted from the shackles 3 and thereupon discharged.

In the area depicted in FIG. 1 two guide rails 4 and 5 are provided between which the shackles 3 move in such a way that they are directed or guided by the rails. These rails 4 and 5 are situated in their operative position, shown in FIG. 1, substantially parallel to the direction of advance of the conveyor 2. The shackles 3 have a projection 6 capable of cooperation with the guide rail 5 limiting the upward movement of the shackle 3.

Two rails 7 and 8 are lying in the vicinity of the bottom of the device said rails forming together an ejector. These rails are provided for that purpose on either side of the shackles and are—as contemplated in the direction of movement—slightly upwardly inclined. By means of these rails 7 and 8 the legs of the poultry clamped in the shackle 3 are upwardly urged and released so that the chicken will fall downwardly and be discharged. The upwardly directed force exerted during this ejection can now be absorbed due to the cooperation between the projection 6 and the guide rail 5.

In order to prevent jamming when two or more shackles are entangled, the guide rails 4 and 5 are movable from their operative position in a direction transverse to the direction of advance of the shackle 3. For that purpose two sleeves 9 are provided in the frame, a cross bar 10 of the rail 4 being supported with ample clearance in said sleeves. Furthermore a spring 11 is provided pressing the rail 4 toward its operative position. The other guide rail 5 can be deflected arcwise and is connected with two levers 12 for that purpose, which at 13 are pivotally connected with the frame 1. A tension spring 14 is provided at the free end of this lever 12, said spring pulling the rail 5 downwardly about pivot 13 toward its operative position represented in FIG. 1.

The guide rail 5 consists of two parts 5' and 5" which are interconnected by overlapping at 15 in such a manner, that the first part 5' on being deflected takes along the second part 5", but on being swung back can loosen itself therefrom. This construction in two pieces of the rail 5 permits of the first part 5' returning again to its operative position when the part 5" is still in its deflected position. The ample clearance of the sleeve 9 allows for sufficient movement of the rail 4, so that the foremost part of the rails 4 and 5 have returned to their operative position whilst the rearmost part situated rightwards in FIG. 1 is still in the deflected position.

Between the rails 4 and 5 on the one hand and the rails 7 and 8 on the other hand are still two auxiliary straps 16 and 17 which can be laterally displaced in a support 18.

It should be noted that in the preceding description an embodiment is represented in which the shackles 3 are provided with a single projection 6 (see FIGS. 2 and 3). The invention relates however also to a device wherein two projections are provided on a shackle, to wit one on either side e.g. in a symmetrical configuration. Under these circumstances the guide rail 4 should not be displaceable rectilinearly but like the guide rail 5 movable according to an arc in order to allow for the passage of possibly entangled shackles.

The device according to the invention is advantageous in that in a definite area of the path of the overhead conveyor the shackles can be positioned in such a way that they have only a single degree of freedom and so will not be deflected when lateral or upwardly directed forces are exerted thereon. The guide rails applied for that purpose can however be deflected under overload in such a manner that the conveyor need not be stopped.

While preferred embodiments of the invention have been shown and described, it is to be understood that changes and variations may be made without departing from the spirit and scope of the invention as defined in the appended claims.

What I claim is:

1. A device for holding poultry for slaughtering and/or plucking comprising an overhead conveyor provided with a number of shackles in which the poultry to be treated can be suspended, at least two guide rails being provided in a part of the path of the conveyor, the rails in their operative position being substantially parallel to the direction of advance of the conveyor and lying on either side of the shackles, so that the shackles can be directed with respect to their direction of advance, each of these shackles having at least one projection which is capable of cooperation with a guide rail in order to limit the upward movement of the shackle; the improvement consisting in that the guide rails are movable from their operative position in a direction transverse to the direction of advance of the shackles, at least one of the guide rails being deflectable arcwise, and means for elastically urging the rails back into their operative position.

2. A device according to claim 1, characterized in that the guide rail which can be arcwise deflected consists of loosely interconnected two parts having overlapping portions whereby—as contemplated in the direction of advance of the shackles—the first part on being deflected takes along the loosely interconnected second part, but on being swung back detaches itself thereform.

3. A device according to claim 1 further characterized in that said shackle consists of a flat framework of wire material, and a projection is provided on at least one side of the shackle and perpendicular to the plane of the framework.

References Cited

UNITED STATES PATENTS

| 3,042,186 | 7/1962 | Varney | 17—11 XR |
| 3,097,391 | 7/1963 | Wayne | 17—11 |

FOREIGN PATENTS 136,525  1/1962  U.S.S.R.

LUCIE H. LAUDENSLAGER, Primary Examiner

U.S. Cl. X.R.

17—44.1